United States Patent [19]

Kodama et al.

[11] 4,416,850

[45] Nov. 22, 1983

[54] SYSTEM FOR COOLING THE ATMOSPHERE IN A PRIMARY CONTAINMENT VESSEL IN NUCLEAR REACTOR AND REMOVING WATER-SOLUBLE GASES AND DUSTS FLOATING THEREIN

[75] Inventors: Tasuku Kodama; Yoshiaki Taruishi, both of Tokyo, Japan

[73] Assignees: Tokyo Shibaura Denki Kabushiki Kaisha, Kanagawa; Nippon Genshiryoku Jigyo Kabushiki Kaisha, Tokyo, both of Japan

[21] Appl. No.: 229,162

[22] Filed: Jan. 28, 1981

Related U.S. Application Data

[63] Continuation of Ser. No. 955,347, Oct. 27, 1978, abandoned.

[30] Foreign Application Priority Data

Nov. 4, 1977 [JP] Japan .................. 52-132271

[51] Int. Cl.³ .............................. G21C 15/18
[52] U.S. Cl. ................... 376/310; 376/313
[58] Field of Search ............ 376/310, 313–315; 55/257 HE; 248/49

[56] References Cited

U.S. PATENT DOCUMENTS

| | | | |
|---|---|---|---|
| 2,880,597 | 4/1959 | Wellborn | 248/49 |
| 3,299,620 | 1/1967 | Hollingworth | 176/37 |
| 3,473,298 | 10/1969 | Berman | 55/257 HE |
| 3,854,909 | 12/1974 | Hoisington et al. | 55/257 HE |
| 3,859,166 | 1/1975 | Flynn et al. | 176/38 |
| 4,243,485 | 1/1981 | Chabin | 376/313 |

FOREIGN PATENT DOCUMENTS

| | | | |
|---|---|---|---|
| 53-6709 | 6/1978 | Japan . | |
| 7313411 | 4/1974 | Netherlands | 376/310 |
| 202918 | 3/1966 | Sweden | 376/310 |
| 7712524 | 7/1977 | Sweden | 376/313 |

OTHER PUBLICATIONS

Proc. 3rd Int. Conf. on Peaceful Uses of Atomic Energy, vol. 13 (9/64) pp. 362–369, Davis et al.

*Primary Examiner*—Sal Cangialosi
*Attorney, Agent, or Firm*—Stevens, Davis, Miller & Mosher

[57] ABSTRACT

A system is for cooling the atmosphere in a primary containment vessel containing a reactor pressure vessel and for removing radioactive and non-radioactive water-soluble gases and dusts floating in the atmosphere of the primary containment vessel by the arrangement which comprises a gas treating casing, a blower connected to the casing, and duct sets connected to the blower.

The gas treating casing contains a water-spray device for spraying cooling water in the casing, a heat exchanger located downstream of the water-spray device, a moisture separator located downstream of the heat exchanger, and a device for removing drain from the casing.

10 Claims, 2 Drawing Figures

SYSTEM FOR COOLING THE ATMOSPHERE IN A PRIMARY CONTAINMENT VESSEL IN NUCLEAR REACTOR AND REMOVING WATER-SOLUBLE GASES AND DUSTS FLOATING THEREIN

This is a continuation of application Ser. No. 955,347 filed Oct. 27, 1978, now abandoned.

BACKGROUND OF THE INVENTION

This invention relates to systems for cooling the atmosphere in a primary containment vessel of a nuclear power plant and for removing water-soluble gases and dust floating in the atmosphere of the primary containment vessel.

Drywell local cooling systems and containment spray systems are well known for cooling the atmosphere in the primary containment vessel of a nuclear power plant.

The drywell local cooling is a cooling system which cools the atmosphere in the drywell of a nuclear power plant. It system is generally used for providing and maintaining suitable temperature and humidity conditions within the primary containment vessel during normal operation of the nuclear reactor and the cooldown period for the atmosphere in the primary containment vessel and is arranged so as to circulate the atmosphere within the primary containment vessel through a heat exchanger by means of a blower and ducting system, cooling of the circulating atmosphere being effected by the heat exchanger.

Although the drywell local cooling system has enough cooling capacity to be applicable for cooling the atmosphere in the primary containment vessel during the normal operation and the cooldown of the nuclear reactor, it cannot sufficiently cool the atmosphere when radioactive vapor fills the vessel during an accident such as breaking of the piping system or a loss of coolant.

The containment spray system is particularly used for maintaining containment temperature and pressure within design limits in the event of loss of coolant and is arranged so as to spray cooling water in the primary containment vessel by means of a water spray device mounted on the upper portion of the vessel fed from a water supply source, to condense the radioactive vapor filling the vessel and to cool non-condensable gases.

However, when the containment spray system is operated at the event of the accident, the sprayed cooling water disperses through the atmosphere in the primary containment vessel and adheres to equipment such as machines, pipes or electric elements in the vessel and damaging their function or accuracy.

SUMMARY OF THE INVENTION

An object of this invention is to provide an improved system for cooling the atmosphere in the primary containment vessel of a nuclear power plant and removing any radioactive water-souble gases floating therein by utilizing the functions of not only the drywell local cooling system but also of the containment spray system described hereinbefore.

According to this invention, there is provided a system for cooling the atmosphere in a primary containment vessel containing a reactor pressure vessel, a gas treating casing, a blower connected to the casing and a duct system for circulating the atmosphere through the primary containment vessel. The gas treating casing comprises a device for spraying cooling liquid to the atmosphere as it passes through the casing, a heat exchanger located downstream of the spray device, a moisture separator for separating radioactive vapor from the gaseous portion of the atmosphere as it passes downstream of the heat exchanger, and a device for draining liquid from gas treating casing.

This system can be used not only for providing and maintaining suitable temperature and humidity conditions within the primary containment vessel during normal operation of the nuclear reactor and the cooldown period, but also for maintaining containment temperature and pressure within design limits in the event of loss of coolant or breaking of the piping system without damaging the function or accuracy of the equipment in the primary containment vessel.

In addition, this system can remove radioactive, water-soluble gases floating in the atmosphere of the primary containment vessel by dissolving them in the sprayed water.

DESCRIPTION OF THE PREFERRED EMBODIMENT

Figure 1:
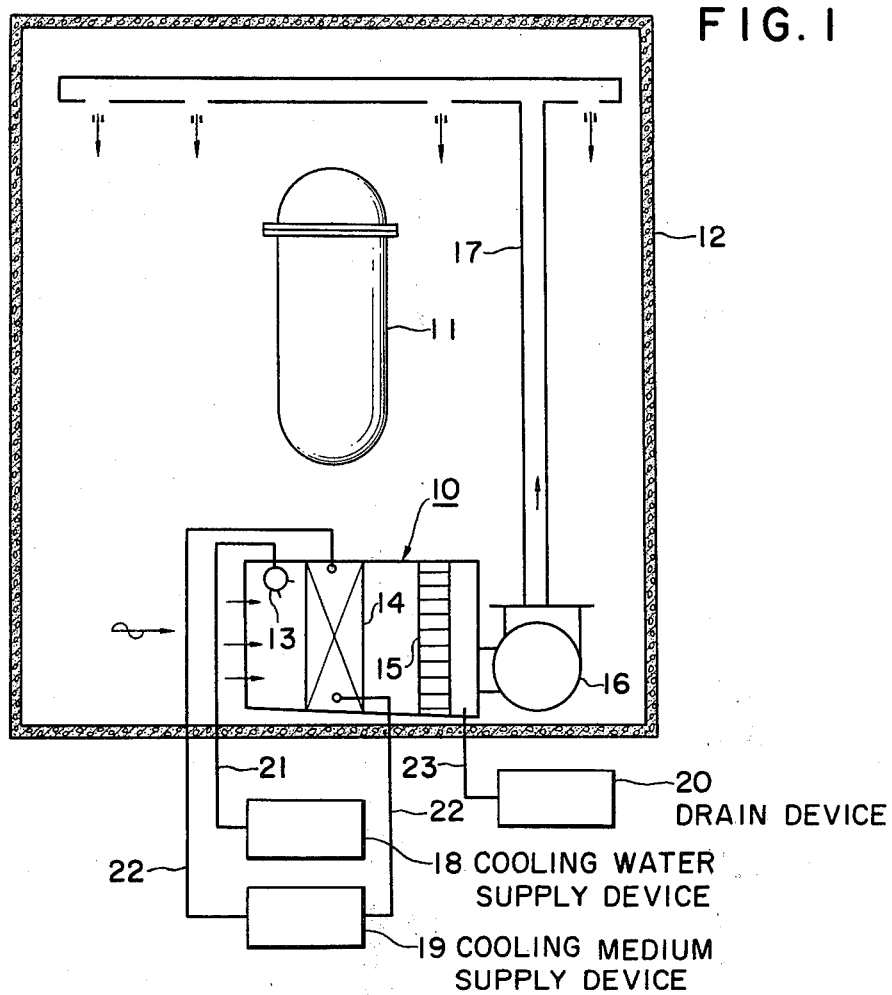
FIG. 1 shows a schematic vertical elevation of a primary containment vessel containing a reactor pressure vessel, provided with a system according to this invention.

A primary containment vessel 12 shown in FIG. 1 contains a reactor pressure vessel 11 and a gas treating casing 10.

The casing 10 is oriented to allow substantially horizontal flow of gases through the casing and contains a water-spray device 13 disposed at the upper portion of the casing 10, a heat exchanger 14 located downstream (righthand as viewed in FIG. 1) of the water-spray device 13 and secured onto the casing 10, and a moisture separator 15 disposed downstream of the heat exchanger 14 and secured onto the casing 10.

A blower 16 is connected to the gas treating casing 10 at the exterior thereof and ducting system 17 is connected to the blower 16 to circulate the atmosphere within the primary containment vessel 12 through the casing 10.

Exterior of the vessel 12, there are provided a water supply source 18 connected to the water-spray device 13 through a pipe 21 for feeding cooling water to the water-spray device 13, a cooling medium supply device 19 for supplying cooling medium to the heat exchanger 14 through a pipe 22, and a drain device 20 for removing liquid from the casing 10 through a pipe 23.

Figure 2:
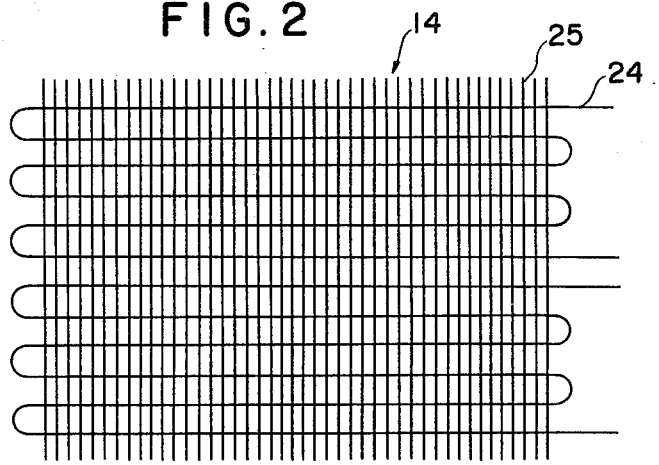
FIG. 2 shows a schematic representation showing one example of a heat exchanger used in this invention.

The heat exchanger 14 comprises a number of tubes 24 and a number of fins 25 crossing the tubes 24 and securing each other as schematically shown in FIG. 2.

The cooling water sprayed from the water-spray device 13 forms water films on the surface of the tubes 24 and the fins 25 of the heat exchanger 14.

The operation of the system of this invention will be described hereunder.

During the normal operation of the nuclear reactor and the cooldown period, the atmosphere in the primary containment vessel 12 is circulated as shown by arrows in FIG. 1 by the blower 16 and the duct sets 17, and the circulating atmosphere in the casing 10 is cooled by the heat exchanger 14 thereby maintaining suitable temperature and humidity within the vessel 12.

On the other hand, in the event of loss of coolant or breaking of the piping system, the primary containment vessel 12 is filled with radioactive vapor. Then the cooling water is sprayed from the water-spray device 13 to mix with and contact the gases in the casing 10.

In mixing and contacting, the condensable gases in the circulating atmosphere are cooled and condensed by the sprayed water, and the uncondensable gases are cooled thereby. At the same time, the radioactive water-soluble gases are dissolved in the sprayed-water.

After mixing and contacting, the sprayed water forms water films on the surface of the heat exchanger 14, and the heat exchanger 14 cools the uncondensable gases and condenses the remaining gases in the circulating atmosphere. At the same time, the remaining radioactive water-soluble gases are dissolved in the water by contacting the gases and the water on the surface of the heat exchanger 14.

Then the moisture separator 15 serves to separate the sprayed water and the condensed water, in which the radioactive, water-dissolved gases are solubed, from the circulating atmosphere.

The separated water is drained into the drain device 20 through the pipe 23, and the atmosphere, which now has substantially no radioactive vapor and no radioactive water-soluble gases is circulated through the duct sets 17 by the blower 16.

Consequently, temperature and pressure of the primary containment vessel 12 are maintained within design limits and the radioactive water-soluble gases floating in the atmosphere of the vessel 12 are removed without damaging the function or accuracy of equipment in the vessel 12 because no water reaches them.

Further, it should be noted that the bottom floor of the gas treating casing 10 is slightly inclined down towards the drain pipe 23 (rightwardly as viewed in FIG. 1) so that the sprayed-water and condensed-water dropped on the floor will flow towards the pipe 23 and then drain into the drain device 20.

As is apparent from the foregoing, according to this invention, the atmosphere in the primary containment vessel can be cooled uniformly and efficiently under the design temperature both in the nuclear reactor normal operation and in the event of loss of coolant, and moreover, in the event of breaking of the piping system.

If there is an accident and a large volume of radioactive vapor leaks out into the atmosphere of the primary containment vessel from the broken piping system, the cooling capacity of the gas treating casing can be increased enough to cool the atmosphere of the primary containment vessel uniformly and efficiently under the design temperature by spraying the cooling water through the water-spray device into the gas treating casing and condensing the vapor with the sprayed water.

At the same time, the radioactive, water-soluble gases can be removed by dissolving them into the sprayed water and condensed water and separating the water from the atmosphere.

Thus, the equipment in the primary containment vessel is not exposed to the sprayed water or the condensed water, so that is operation is not damaged.

We claim:

1. A system for cooling the gaseous atmosphere in a primary containment vessel comprising:

casing means inside said primary containment vessel for controlling flow of gases within the primary containment vessel, said casing means having inlet means and outlet means;

means located adjacent said inlet means for spraying a first cooling liquid within said casing means;

heat exchanger means for cooling the gases positioned within said casing, said heat exchanger means being located downstream of said spraying means and spanning the interior of said casing means;

blower means connected to said casing means for causing gases to circulate through said casing means from said inlet means to said outlet means; and means located downstream of said heat exchanger means for separating moisture and radioactive vapor from the gases;

said spraying means operating to spray said first cooling liquid directly onto said heat exchanger means to form a thin liquid film on the surface of said heat exchanger means, said casing means comprising an unrestricted opening between said spraying means and said heat exhanger means such that the first cooling liquid from said spraying means may form said thin liquid film on said heat exchanger means in a substantially unrestricted and unimpeded manner, said heat exchanger means having a second cooling liquid circulating therethrough, said spraying means being supplied with said first cooling liquid from a first cooling liquid supply device and said heat exchanger means being supplied with said second cooling liquid from a second cooling liquid supply device, whereby the thin liquid film formed on the outer surface of said heat exchanger means operates both to cool the gases passing within said casing means and to absorb radioactive water-soluble gases.

2. A system for cooling the gaseous atmosphere in a primary containment vessel according to claim 1, wherein the first and second cooling liquids are both water.

3. The system of claim 1 further comprising drain means for removing liquid from said casing means.

4. The system of claim 1 wherein said heat exchanger means comprises parallel, circuitous tube means for containing said second cooling liquid and a plurality of fins crossing said tube means and secured to said tube means such that the first cooling liquid from said spraying means forms said thin film on the surface of said tube means and fins.

5. The system of claim 1 or 4 wherein said spraying means is not operated continuously, but is operated under abnormal conditions such as in the event of a loss-of-coolant accident.

6. The system of claim 1 or 4 wherein the thin liquid film covering said heat exchanger absorbs radioactive iodine.

7. The system of claim 1 or 4 further comprising duct means connected to said blower means for directing gases to the upper portion of said primary containment vessel.

8. The system of claim 7 wherein said blower means is connected to said casing means adjacent said outlet means.

9. In a system for cooling gaseous atmosphere in a primary containment vessel containing a treating casing having a substantially horizontal gas flow direction, a blower connected to said casing, a duct connected to said blower and a drain system connected to said casing, said casing, said blower and said duct constituting a gas circulating system, said casing comprising means for spraying a cooling liquid to the gaseous atmosphere, a heat exchanger, and means for separating moisture and radioactive vapor from the gaseous atmosphere, the improvement in which said spray means is connected to a cooling liquid supplying source and is located at the inlet position of said casing so as to spray the cooling liquid directly onto the outer surface of said heat exchanger to form a thin liquid film thereon as well as to cool the gaseous atmosphere, said heat exchanger being located downstream of said spray means and spanning the interior of said casing, and said moisture separating means being disposed downstream of said heat exchanger.

10. The system according to claim 9 wherein said cooling liquid spray means is operated at the time of fault such as loss of coolant.

* * * * *